United States Patent [19]

Tucker et al.

[11] Patent Number: 5,681,363
[45] Date of Patent: Oct. 28, 1997

[54] VACUUM CLEANER FILTER SHAKER

[76] Inventors: Deborah R. Tucker, 3730 Apache St., NW., Uniontown, Ohio 44685; Lynn A. Frederick, 6225 Washington St., Brady Lake, Ohio 44211; Jeffrey S. Louis, 980 E. Nimisila Rd., Akron, Ohio 44319

[21] Appl. No.: 617,212
[22] Filed: Mar. 18, 1996
[51] Int. Cl.$^6$ .................. B01D 45/018; B01D 46/04
[52] U.S. Cl. .................. 55/300; 55/304; 55/293; 95/282
[58] Field of Search .................. 55/293, 304, 378, 55/379, 305, 300

[56] References Cited

U.S. PATENT DOCUMENTS

| 994,462 | 6/1911 | Harrold. | |
| 1,082,356 | 12/1913 | Newkirk. | |
| 1,124,574 | 1/1915 | Zimmer. | |
| 1,176,721 | 3/1916 | Zimmer. | |
| 2,443,162 | 6/1948 | Hallock | 183/54 |
| 2,594,417 | 12/1952 | Gerber | 183/58 |
| 2,951,553 | 9/1960 | Kirby | 55/378 |
| 3,568,413 | 3/1971 | Jerabek | 55/288 |
| 3,853,517 | 12/1974 | Mitchell | 55/304 |
| 4,405,346 | 9/1983 | Tschudy et al. | 55/378 |
| 5,322,534 | 6/1994 | Kaiser | 55/304 |

OTHER PUBLICATIONS

McGraw–Hill Encyclopedia of Science and Technology, "Spring (machines)", vol. 17, 7th Edition, pp. 283–284 1992.

Encyclopedia Americana, "Umbrella", vol. 27, p. 353g 1978.

Primary Examiner—Jay H. Woo
Assistant Examiner—Robert Hopkins
Attorney, Agent, or Firm—A. Burgess Lowe; Richardson B. Farley

[57] ABSTRACT

A filter shaking arrangement includes a resilient frame disposed around an expandable filter, both of which are expanded by a fan induced air flow. The resilient frame returns resiliently to its original form upon the cessation of this air flow. This contraction of the resilient frame tends to dislodge dirt adhering to the filter as it also is forced back to its original shape.

9 Claims, 3 Drawing Sheets 5,681,363

VACUUM CLEANER FILTER SHAKER

BACKGROUND OF THE INVENTION

1. Field of the Invention

This invention relates to filter arrangements and, more specifically, relates to shaking of such a filter arrangement.

2. Summary of the Prior Art

It is known to provide some type of mechanism to shake or jar a filter to dislodge, e.g., dirt adhered to it. Such mechanisms include at least partially resilient frameworks disposed internally of the filter which shake due to motor vibrations or which elastically contract as a filter tends to partially collapse under suction conditions only to expand again upon the cessation of suction. However, no resiliently expanding, outwardly disposed filter shaking arrangement is known that expands, as the filter expands, during suction airflow, and then returns to its original shape upon the termination of suction, forcing the filter back into its original unexpanded state and tending to dislodge adhering dirt therefrom. Such a filter and frame arrangement would be very advantageous, e.g., for use in a vacuum cleaner, especially one having a dirt cup feature.

Accordingly, it is object of the invention to provide an improved filter shaking arrangement.

It is an additional object of the invention to provide a filter shaking arrangement that includes a framework disposed around the filter.

It is a further object of the invention to make the filter surrounding framework at least partially resilient.

It is a still further object of the invention to provide a filter shaking arrangement which is easily adaptable to use with a vacuum cleaner that utilizes a dirt cup.

It is also an additional object of the invention to utilize a filter shaking framework that includes a flexible hinge that aids in filter cleaning.

It is additionally an object of the invention to provide a filter shaking arrangement that includes effective sealing for the air flow through its filter.

SUMMARY OF THE INVENTION

The invention comprehends the use of a dirt separating filter and its shaker mechanism mounted within the top and extending upwardly out of a dirt cup in a dirt cup cleaner. The flow of dirty suction air is through the side of the dirt cup and upwardly through the filter as motivated by a fan-motor system disposed in a housing section about the filter.

The filter is cloth and generally bag shaped having its open end deployed downwardly so that suction air may freely move there into it to pass outwardly, upwardly of the dirt cup to deposit dirt in the cup. This filtering process also inherently includes a certain portion of the dirt being deposited and adhering to the inner surface of the fabric of the filter bag. This adhering dirt would eventually clog a good portion of the fabric of the filter, limiting suction air passage therethrough so that a means of dislodgement of this dirt is necessitated.

A filter shaker frame is disposed outwardly of the filter bag which includes a sealing arrangement adjacent its upper and lower surfaces to seal to the internal peripheral surfaces of the motor-fan housing and the dirt cup. It also includes a lower, inner flange to provide a stitching surface to permanently sew lower reaches of the filter bag to the shaker frame.

Extending upwardly from an integral flat face of the shaker frame at the upper termination of the lower, inner flange are a series of six integral arms. These arms are grouped, three at each end of the filter bag, so that each loops downwardly into a central pocket configuration of the bag. They are there each joined integrally to a horizontally extending small oval frame disposed at the bottom of the central pocket.

The arms and their connection to the oval frame are sufficiently resilient to be deflected by distortion of the filter bag when suction is applied to initiate cleaner cleaning action. During this time the filter bag distorts outwardly causing the resilient arms to bulge outwardly, shortening their height and moving the oval frame upwardly. When the cleaner is de-energized, suction air flow ceases and the arms and oval frame return resiliently to their original position forcing the filter bag back to its original position. This tends to shake adhering dirt off the filter bag's internal surface to maintain the efficacy of the cleaning effort.

BRIEF DESCRIPTION OF THE DRAWINGS

Reference may be had to the accompanying Drawings for a better understanding of the invention, but as to its organization and function, with the illustration only showing a preferred embodiment, but being only exemplary and in which.

DETAILED DESCRIPTION OF THE INVENTION

Figures 1, 2:
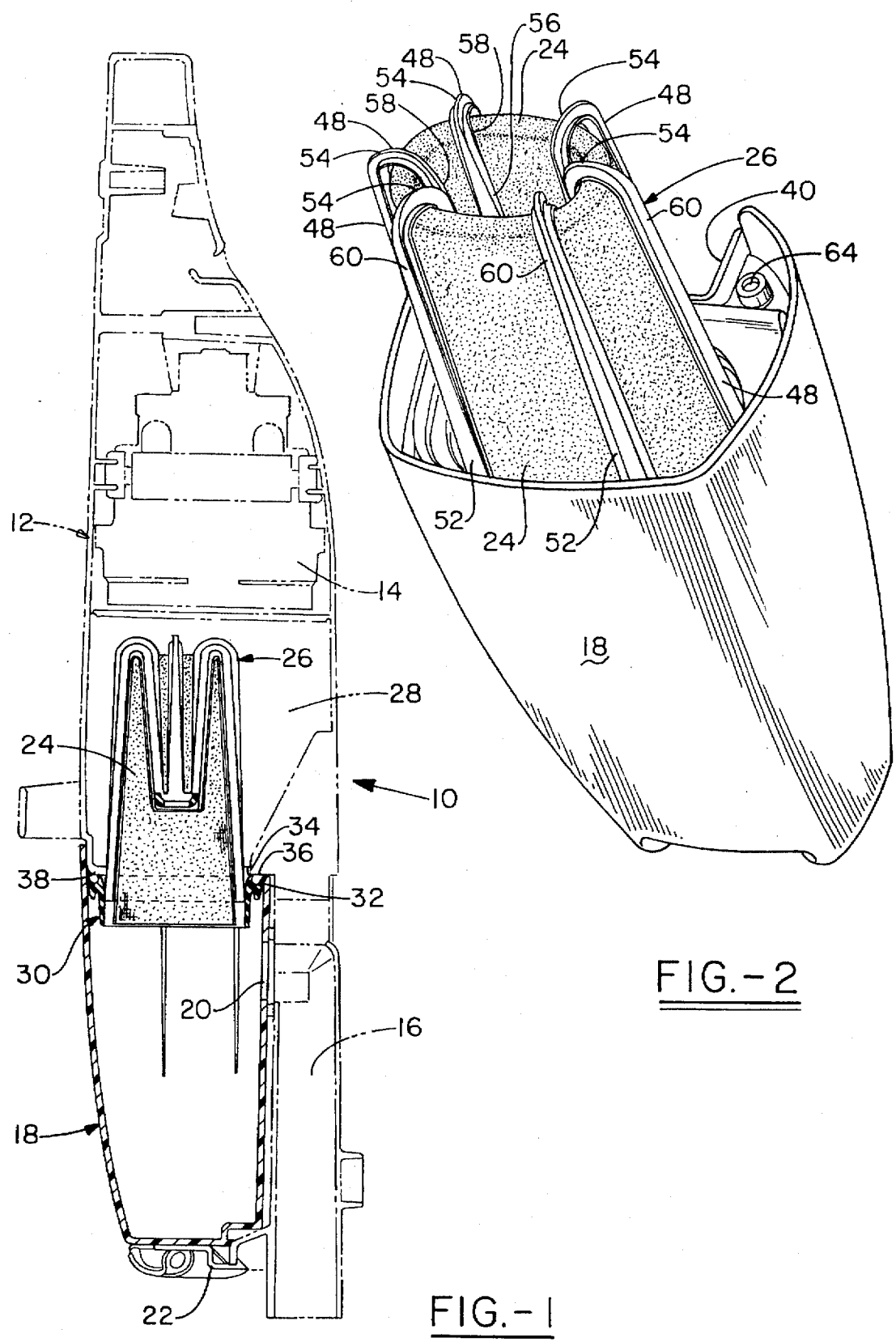
FIG. 1 is a longitudinal, elevational cross-section of a dirt cup cleaner containing the inventive, filter shaker frame.
FIG. 2 is a top perspective view of the dirt cup, filter bag and shaker frame.
Figure 3:
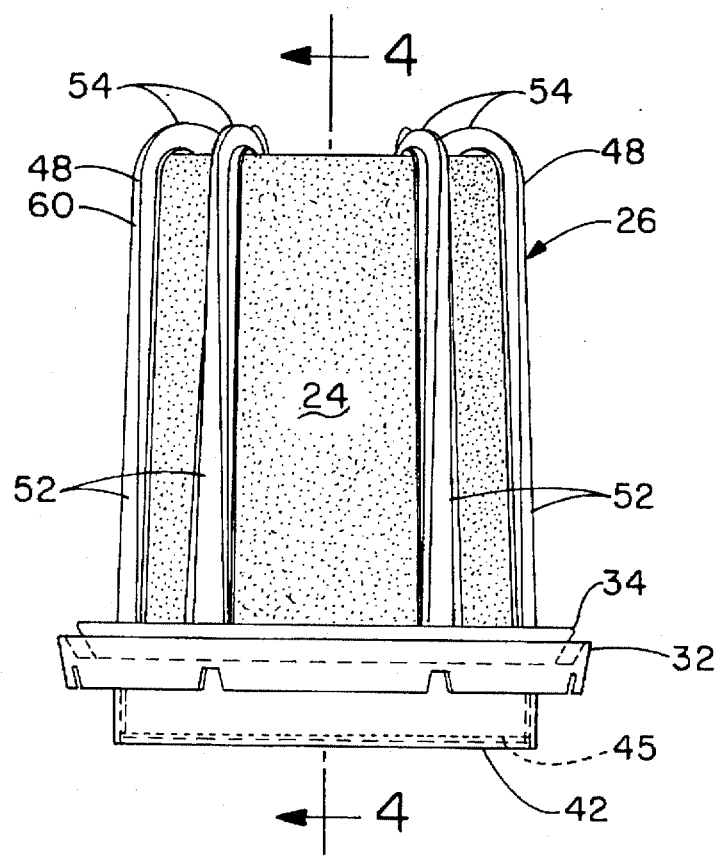
FIG. 3 is an elevational view of the filter bag and shaker frame in an undistorted condition.
Figure 4:
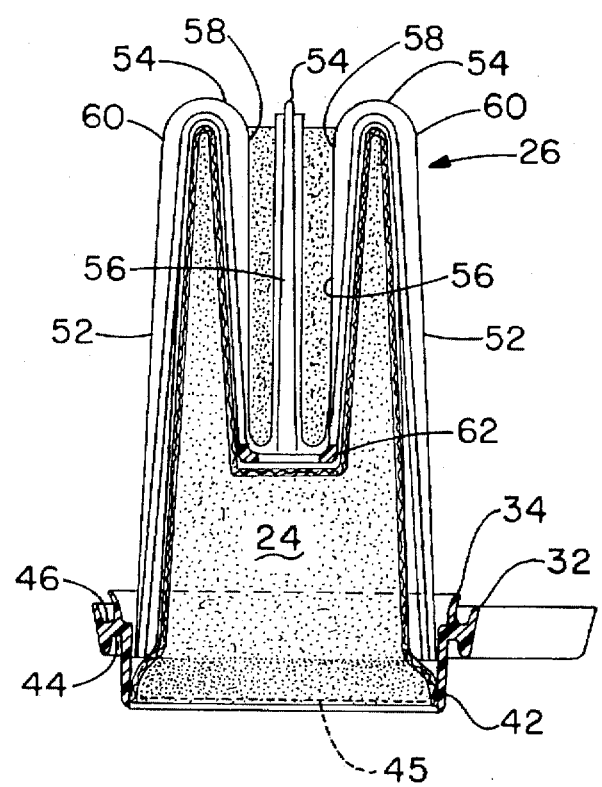
FIG. 4 is a cross-sectional elevational view of the same.

There is shown in FIG. 1, a dirt cup cleaner 10 which, in this case, takes the form of a stick cleaner. Dirt cup cleaner 10 includes an outer housing 12 within whose upper confines a motor-fan system 14 is lodged. A handle (not shown) may conveniently be attached to the upper end of outer housing 12. At the lower end of dirt cup cleaner 10, a suction tube 16 to which a working nozzle (not shown) is attached extends upwardly to communicate sidewardly with a dirt cup 18 through a port 20 disposed in an upper side thereof. A latch 22 partly mounted to suction tube 16 and partly mounted on the bottom of the dirt cup 18 removably attaches the dirt cup 18 to the dirt cup cleaner 10. A filter 24 in the shape of an upwardly open bag, cross-sectionally oblong in shape to maximize bag area, is disposed within upper reaches of dirt cup 18 by being mounted within a shaker frame 26. This frame and the filter bag extend upwardly beyond the dirt cup 18 to lodge in a suction chamber 28 of dirt cup cleaner 10, immediately below the motor-fan system 14.

The shaker frame 26 is a thermoplastic elastomeric and thereby resilient and deformable. Such a material is sold under the registered trademark, "Santoprene" by Advanced Bastomen Systems, L. P., Akron, Ohio. It includes a lower sealing frame means 30 having a lower outer rim 32 and an upper inner rim 34. Both of these rims deform to insure proper sealing. Outer rim 32 engages telescopingly, sealingly downwardly against the internal periphery of dirt cup 18 while inner rim 34 abuttingly seals upwardly against bottom portions 36, 38 of the outer housing 12 of dirt cup cleaner 10.

Figure 5:
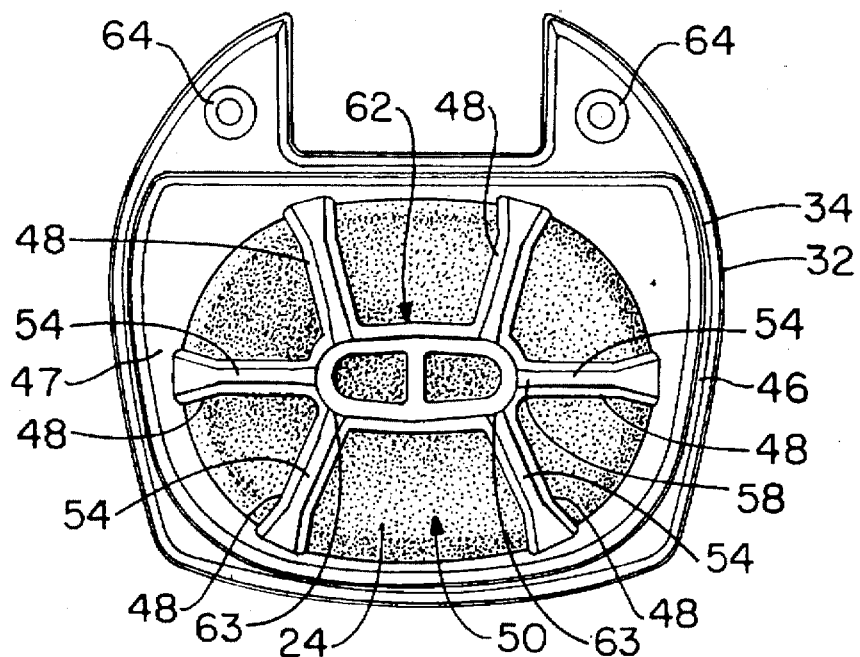
FIG. 5 is a top plan view of the same.

Dirt cup 18 includes a vertically extending indented portion 40 on its rear side which fits around and telescopically receives upper portion of the suction tube 16. The outer rim 32 has an outer periphery (FIG. 5) shaped to accommodate the shape of the top portion of the dirt cup 18 including the indented portion 40. The inner rim 34 is somewhat curvilinear oblong in extent to affirmatively engage sealing against the bottom portions 36, 38 of the outer housing 12 of the dirt cup cleaner 10.

A more detailed and thoroughgoing description of the general arrangement the dirt cup cleaner 10 may be afforded by reference to Hoover Case 2449 submitted to the Patent Office on the 30th of Jan. 1996 and titled "Latchable Dirt Cup for Hard Bag Stick Cleaner". That Case is hereby made a record reference in this Application.

The rims 32 and 34 of sealing frame means 30 extend completely around the periphery of sealing frame means 30 and are disposed to extend slightly outwardly to give these seals a generally conical effect, except in the volume occupied by the indented portion 40 of dirt cup 18. This gives the lower outer rim seal 32 a wedging seal assembly with the dirt cup 18 and the upper inner rim 34 a resilient outwardly deforming abutting face seal with the outer housing 12 to thereby accommodate imperfections at the sealing faces. The lower outer rim seal 32 is thickened in cross-section at its bottom to provide additional rim strength to this element for more affirmative wedge sealing.

The shaker frame 26 also includes an internal, continuous, downwardly depending flange 42 which is integral with the rims 32 and 34 and is connected to them by connecting webs 44 and 46. The flange 42 is generally oblong in plan view and extends sufficiently below lower outer rim 32 to provide an area for a stitch line 45 which securely connects the bag filter 24, disposed within the shaker frame 26, to the flange 42.

Extending upwardly from a flat 47 of shaker frame 26 are a series of arms 48, 48, 48, 48, 48 and 48 which provide the resilient deformation for the shaker frame 26 and thereby its shaking function. These arms take the shape in cross-section of "T" beams so as to enhance their strength. The flat 47 is bordered near its outer perimeter by the upper inner rim 34. Thus, it serves as a general stiffening member of the shaker frame 26 as well as a locus for the bottom joinder of the arms 48, 48, 48, 48, 48 and 48. Interiorly of these arms and extending between them is an oblong hole 50 formed in a flat 47. This oblong hole is dimensioned similarly to the internal periphery of the downwardly depending flange 42 so as to maintain a substantially continuous cross-sectional area of the filter bag 24 at these locations.

The arms 48 extend upwardly from flat 47 in a slight inwardly angled manner by means of arm portions 52 so as to be truncated conical form. This aids in molding the shaker frame 26. At the upper ends of the arm portions 52, they each include a substantially 180° bend 54 which extends into a downwardly disposed arm portion 56. This arm configuration lends to a maximum inward folding of filter bag 24 and thereby increases its effective cross-sectional area.

Each of the bends 54 of each of the arms 48 includes a pair of inner and outer turns 58, 60. During expansion of the filter bag 24 (FIG. 6) and while suction is being applied by the motor-fan system 14, these turns deform readily, permitting the shaker frame 26 to deform, driven by the filter bag 24 expansively prior to its resilient return to its non-suction position. There is also some deformation of the arms 48, themselves.

The downwardly disposed arm portions 56 terminate in an integral horizontally extending oblong, inner frame 62, shaped in cross-section like the filter bag 24 but smaller so as to fit inside it and the remainder of the shaker frame 26. This frame, because of the bag pressure imposed collectively on its planar area, acts somewhat as a pushing plate for the shaker frame 26, to expand it against its own inherent resiliency, although the total arm arrangement of the shaker frame 26 as aforesaid also is driven by the filter bag 24 in an expansive movement. Joinders 63, 63, 63, 63, 63 and 63, formed at the lower integral junctures of the arms 48, 48, 48, 48, 48 and 48 with the oblong, inner frame 62, hinge readily during this deformation, permitting the arms 48 to move outwardly while the inner, oblong frame 62 moves upwardly.

The arms 48, 48, 48, 48, 48 and 48 are disposed with three at each end of the upper portion of filter bag 24. Each array of three arms 48, 48 and 48 is situated with one at the middle of the end of the filter bag 24 and one along each of its sides, close to the end of the filter bag 24. This arrangement distributes the expansion force of the filter bag 24 fairly equally so that the shaker frame 26 does not distort unequally anywhere along its outer periphery. These arms also prevent and limit bag intrusion into the volume occupied by the fan of the motor-fan system.

The shaker frame 26 structure is completed by a pair of upwardly extending bosses 64, 64 on flat 47 which abut against a part of the bottom portion 36 of outer housing 12 to insure proper seating of the shaker frame 26 and its included bag filter 24 within dirt cup 18.

The filter bag 24 is made of a substantially non-pliant filter material of non-woven characteristic so that it would assume essentially an undistorted position when not under cleaner suction condition. The intrusion of the arms 48, 48, 48, 48, 48 and 48 downwardly therein during assembly of the filter bag 24 and shaker frame 26 forms a bottomed pocket 66 in the filter bag 24 to thereby provide the aforementioned maximized filtering area for the flow of suction air in stick cleaner 10.

Figure 6:
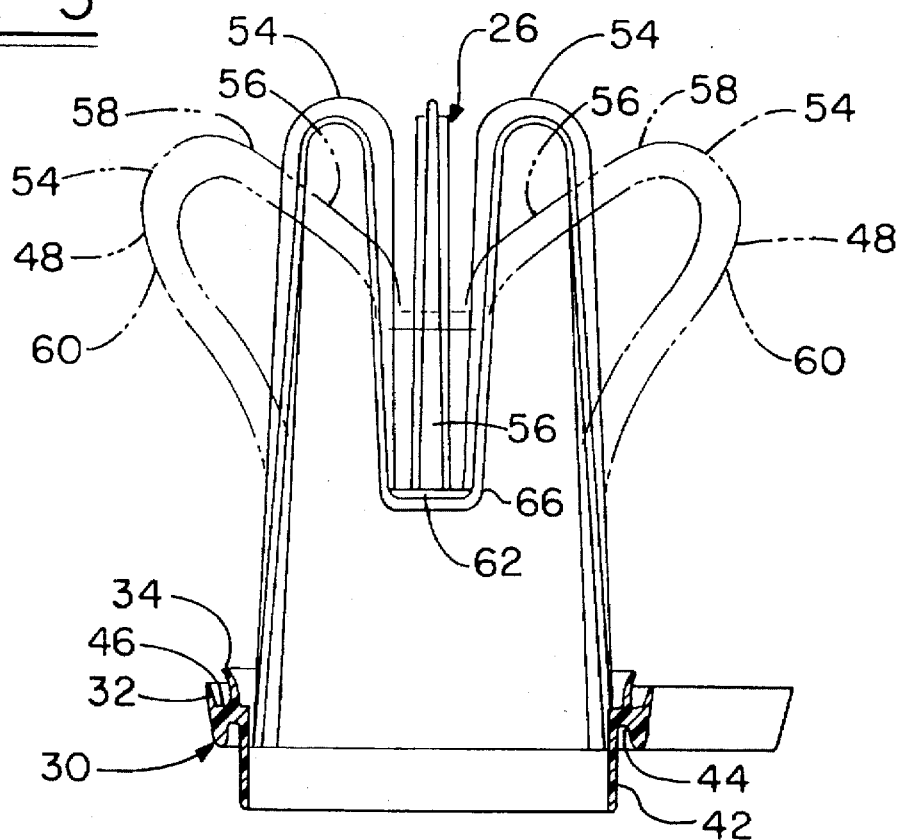
FIG. 6 is another cross-sectional elevational view of the filter bag and shaker frame but also showing the shaker frame in its approximate distorted state.

The operation of the invention should now be apparent. The shaker frame 26 through the flexible hinges of joinders 63, bends 54 and the arms 48 distort as shown in FIG. 6 as driven by the expanding filter bag 24 during cleaner operation. Upon cessation of cleaner operation, the residual and persistent resiliency of the shaker frame 26 returns it to its original untensioned condition (FIGS. 1–5) causing filter adhering dirt to drop into the dust cup 18.

It should be clear from the foregoing description that all the objects of the invention have been satisfied. Further, it should be obvious to one skilled in the art that many modifications could be made to the described structure which would still fall within its gambit, spirit and purview.

What is claimed is:

1. A filter shaking arrangement including:
   a) a filter at least partly in the shape of an open bag;
   b) a frame disposed around at least a part of said filter;
   c) said frame being resilient so as to be capable of elastic deformation;
   d) said filter expanding upon the imposition of air flow therethrough causing said frame also to expand;
   e) said filter being returned to its original non-expanded state upon the interruption of said air flow and the elastic contraction of said frame f) said frame includes a series of arms extending at least partly around said filter;

g) said arms extending upwardly along said bag shape of said filter to provide upwardly extending portions;

h) said upwardly extending arm portions being bent at their tops to form bends; and i) downwardly depending arm portions also extending from said bends to be disposed inwardly of said upwardly extending arm portions so as to be insertingly disposed in a center depression formed in said bag shape.

2. The filter shaking arrangement of claim 1 wherein:

a) said arms are grouped at the ends of the upper end of said bag shape.

3. The filter shaking arrangement of claim 1 wherein:

a) said series of arms totals six.

4. An elastomeric filter shaking frame including:

a) a base extending around said frame;

b a series of arms extending upwardly from said base;

c said arms each having at least a pair of turns intermediate its ends; and d each of said turns acting in a deforming manner for said elastomeric filter shaking frame.

5. The elastomeric filter shaking frame of claim 4 wherein:

a) a bend is formed of substantially a 180° by a pair of said turns.

6. The filter shaking arrangement of claim 1 wherein:

a) said filter shaking framework is disposed in a dirt cup cleaner having a dirt cup and a housing;

b) said filter frame is sealingly mounted downwardly in said cleaner dirt cup; and c) said filter frame is disposed to seal upwardly in said cleaner housing.

7. The filter shaking arrangement of claim 6 wherein:

a) said downward sealing of said filter frame in said dirt cup is formed by a wedging seal with said dirt cup seal; and b) said upwardly sealing is formed by a face seal with said cleaner housing; whereby sealing with said dirt cup is obtained between said dirt cup, said filter, said frame and said cleaner housing.

8. The filter shaking arrangement of claim 1 wherein:

a) said downwardly depending arm portions terminate in a bottom flat frame; and b) said flat frame serves as a pushing plate to aid in expanding said filter shaking arrangement during its expanding and contracting movement.

9. The filter arrangement of claim 8 wherein:

a) a joinder is formed at the said termination of each of said downwardly depending arm portions and said bottom flat frame;

b) each of said joinders acting as a flexible hinge as said filter shaking arrangement expands and contracts.

* * * * *